US010969516B2

(12) United States Patent
Werner et al.

(10) Patent No.: US 10,969,516 B2
(45) Date of Patent: Apr. 6, 2021

(54) METHOD FOR OPERATING A PHOTOELECTRIC BARRIER

(71) Applicant: ELESTA GmbH, Ostfildern (DE), Zweigniederlassung Bad Ragaz, Bad Ragaz (CH)

(72) Inventors: Christoph Werner, Widnau (CH); Massimo Maffioli, Malvaglia (CH); Michael Vogel, Sargans (CH)

(73) Assignee: ELESTA GmbH, Ostfildern (DE), Zweigniederlassung Bad Ragaz

( * ) Notice: Subject to any disclaimer, the term of this patent is extended or adjusted under 35 U.S.C. 154(b) by 119 days.

(21) Appl. No.: 16/219,632

(22) Filed: Dec. 13, 2018

(65) Prior Publication Data

US 2019/0187329 A1   Jun. 20, 2019

(30) Foreign Application Priority Data

Dec. 14, 2017   (CH) .................................... 01518/17

(51) Int. Cl.
*G01V 8/20* (2006.01)
*F16P 3/14* (2006.01)

(52) U.S. Cl.
CPC ................ *G01V 8/20* (2013.01); *F16P 3/144* (2013.01)

(58) Field of Classification Search
CPC .................................... G01V 8/20; F16P 3/144
See application file for complete search history.

(56) References Cited

U.S. PATENT DOCUMENTS

2013/0221204 A1*   8/2013   Mueller ................... G01V 8/20
                                                        250/208.2

* cited by examiner

*Primary Examiner* — Georgia Y Epps
*Assistant Examiner* — Don J Williams
(74) *Attorney, Agent, or Firm* — Morriss O'Bryant Compagni Cannon, PLLC

(57) ABSTRACT

A method for operating a photoelectric barrier as well as a photoelectric barrier with at least one first and one second optoelectronic machine guard. The first optoelectronic machine guard has a first transmitter and the second optoelectronic machine guard has a second transmitter and receiver unit. The transmitters of the first optoelectronic machine guard are successively activated during a run of a first cycle so as to emit a single light pulse, and the transmitters of the second optoelectronic machine guard are successively activated during a run of a second cycle so as to emit a single light pulse. The cycles occur substantially simultaneously.
A duration of the first cycle is lengthened or shortened by the duration of a first phase offset ΔA and that the duration of the second cycle is lengthened or shortened by the duration of a second phase offset ΔB.

19 Claims, 2 Drawing Sheets

METHOD FOR OPERATING A PHOTOELECTRIC BARRIER

CROSS-REFERENCE TO RELATED APPLICATION

This application claims priority to Swiss Patent Application No. 01518/17 filed Dec. 14, 2017, the entirety of which is incorporated by this reference.

FIELD OF THE INVENTION

The invention pertains to a method for operating a photoelectric barrier. The invention also pertains to an optoelectronic machine

STATE OF THE RELATED ART

The invention lies quite generally in the field of safety technology in the sense of protecting persons or material assets against hazards stemming from operating systems or machines, such as automated working robots, for example. A typical protective measure is to block off the hazard area of such a system so that entry of the hazard area is either impeded or leads to stopping, disconnecting, or otherwise neutralizing the hazardous operating situation. Frequently mechanical protective fences or protective doors are used to block off such a danger area. In many cases, however, access to the secured hazard area is necessary, be it because an operator regularly requires access to the machine or because material must be transported into or out of the hazard area. For such cases, optoelectronic protective devices are often used, in particular optoelectronic machine guards, which depending on design and arrangement are also called light barriers or light-beam curtains. Depending on requirement, such optoelectronic machine guards are intended to ensure finger, hand, or body protection according to EN/IEC61496-1/-2/-3.

In an industrial milieu, it is common to mount several optoelectronic machine guards in close proximity to one another. It can therefore not be ruled out that a transmitter of a first optoelectronic machine guard optically talks over a second optoelectronic machine guard. The affected optoelectronic machine guard in a case like this still has to operate without disruption, however.

Toward this end, the most diverse solution approaches are known from the prior art. For example, in EP0797109 a method of operating a photoelectric barrier is described which has two synchronously operating transmitter/receiver pairs, wherein each of the two transmitters sends out light signals having a specific identifier in the form of double pulses. This design requires that the two transmitter/receiver pairs have to be synchronized. This is difficult to implement.

EP2230538 discloses a method for operating an optoelectronic sensor arrangement, in which several light transmitters emit light signals to a monitoring region, wherein at least the light signals have different base modulation frequencies. This way it is possible to distinguish the light transmitter which relays the received light signal. This design means that both the transmitter unit and the receiver unit must be designed in a technically complicated manner so as to be able to reliably produce and detect the modulation.

SUMMARY OF THE INVENTION

The invention provides an alternative method and an alternatively constructed photoelectric barrier so as to be able to operate at least two spatially proximate optoelectronic machine guards reliably, stably, and without disruption. In addition the invention provides an optoelectronic machine guard for the method and the photoelectric barrier.

The starting point of the invention is a method for operating a photoelectric barrier for a photoelectric barrier having at least one first optoelectronic machine guard with a first transmitter and receiver unit, wherein all transmitters of the first transmitter unit are activated successively during the run of a first cycle so as in each case to emit a single light pulse, and all transmitters of the second transmitter unit are activated successively during the run of a second cycle so as in each case to emit a single light pulse, and the cycles occur substantially simultaneously. According to the invention now the duration of the first cycle is lengthened or shortened by the duration of a first phase offset ΔA, and the duration of the second cycle is lengthened or shortened by the duration of a second phase offset ΔB. In this way different-length cycle times are produced for the two optoelectronic machine guards. With the appropriate selection of the first phase offset ΔA and the second phase offset ΔB, interference freedom can be guaranteed for a specific number of cycles. Synchronization between the two optoelectronic machine guards is not necessary. The method according to the invention ensures that for a defined number of cycles, always only at most one time during a minimal number of cycles are the single light pulses of the two optoelectronic machine guards systematically overlapped or interfered. For the sake of clarification, it should be noted that cycle or cycle time is understood to be that time that passes until all transmitters and receivers of a transmitter and receiver unit of an optoelectronic machine guard have been sequentially activated so as to emit or receive a single light pulse. It is further clarified that the cycles of the first and second optoelectronic machine guards occur substantially simultaneously. In terms of time, therefore the cycles of the optoelectronic machine guards occur in parallel, i.e., both optoelectronic machine guards start their respective cycle substantially at the same time.

The method according to the invention can for example be implemented advantageously in that during a cycle the intermediate pulse time $T_{Task}$ for a single transmitter of each optoelectronic machine guard is shortened or lengthened by the duration of the phase offset ΔA, ΔB, wherein the intermediate pulse time $T_{Task}$ in all other transmitters of the optoelectronic machine guards is kept of equal length. Specifically therefore, at the end of a cycle the intermediate pulse time $T_{Task}$ of the transmitter that was activated last can be adjusted. Here it should be noted that with an optoelectronic machine guard with a plurality of transmitters and receivers, intermediate pulse time is understood as that time which passes between the emission of single light pulses by two adjacent transmitters.

Alternatively, it is also possible for all transmitters of an optoelectronic machine guard, that during a cycle the intermediate pulse time $T_{Task}$ is proportionately shortened or lengthened by the duration of the phase offset ΔA, ΔB. This means that the intermediate pulse time $T_{Task}$ of all transmitters must be adjusted slightly, For a given pulse width $T_{Puls}$ of the single light pulses and for a given average intermediate pulse time $T_{Task}$, the following inequality applies for determination of the first phase offset ΔA and the second phase offset ΔB:

$$T_{Puls} \leq \left( n_{Zyklus} \cdot \Delta A - \left\lfloor \frac{n_{Zyklus} \cdot N_{Beams_A}}{N_{Beams_B}} \right\rfloor \cdot \Delta B \right) \bmod T_{Task} \leq T_{Task} - T_{Puls}.$$

wherein $$\forall\, n_{Zyklus}=\{1,\ldots,(N_{samples}-1)\}$$

$$\forall\, N_{Beams_A}=\text{for the number of beams of the optoelectronic machine guard with the coding } A$$

$$\forall\, N_{Beams_B}=\text{for the number of beams of the optoelectronic machine guard with the coding } B.$$

Here $|\Delta A|$ is the phase offset of the first optoelectronic machine guard $|\Delta B|$ is the phase offset of the second optoelectronic machine guard $T_{Puls}$ pulse width of the single light pulse $n_{Zyklus}$ current cycle $N_{Beams_A}$ number of light beams of the first optoelectronic machine guard (corresponds to the number of transmitters and thus to the number of receivers)

$N_{Beams_B}$ number of light beams of the first optoelectronic machine guard (corresponds to the number of transmitters and thus to the number of receivers)

$T_{Task}$ time between the emission of two adjacent single light pulses (intermediate pulse time)

$N_{samples}$ number of samples of a light beam

In particular the following restrictions must be maintained:

$$|\Delta A| \geq T_{Puls}$$

$$|\Delta B| \geq T_{Puls}$$

$$\Delta A \neq \Delta B$$

and alternatively $$|\Delta A| = |\Delta B|.$$

The above-named inequality can be solved numerically. If the above-named conditions are fulfilled, and if the phase offset ΔA and the phase offset ΔB are accordingly selected, after one interfered cycle the next ($N_{samples}-1$) cycles are guaranteed to be interference-free, i.e., an overlap of the single light pulses can be ruled out. The selection of the parameters $T_{Puls}$, $T_{Task}$, ΔA, ΔB und $N_{samples}$ must be made such that the required response time and robustness of the optoelectronic machine guard are present. In the named inequality, the number of light beams $N_{Beams_A}$ and $N_{Beams_B}$ is taken into account. Therefore, the invention can also be used for photoelectric barriers and methods in which the optoelectronic machine guards have different lengths. For example, the first optoelectronic machine guard can have a first length, and can be operated together with a second optoelectronic machine guard with a second length, wherein the lengths can have a value between 150 mm to 1800 mm, and a denomination of 150 mm.

Transmitters and receivers of the respective optoelectronic machine guard may be optically synchronized with one another. Consequently simultaneously with the activation of a transmitter, the receiver assigned to this transmitter is activated.

For the case that more than two optoelectronic machine guards are used in a photoelectric barrier, according to the invention the method is to be structured such that each optoelectronic machine guard of the photoelectric barrier operates with a phase offset, which differs from all other phase offsets of the other optoelectronic machine guards of the photoelectric barrier.

The invention also pertains to a photoelectric barrier with at least one first and one second optoelectronic machine guard, wherein the first optoelectronic machine guard has first and the second optoelectronic machine guard second transmitter and receiver units, wherein all transmitters of the first optoelectronic machine guard can be activated successively during the run of a first cycle so as to emit a single light pulse and all transmitters of the second optoelectronic machine guard can be activated successively during the run of a second cycle so as to emit a single light pulse, and the cycles occur substantially simultaneously, in particular for use in a method according to the invention, wherein the first optoelectronic machine guard is configured so as to lengthen or shorten the duration of the first cycle by the duration of a first phase offset ΔA, and that the second optoelectronic machine guard is configured so as to lengthen or shorten the duration of the second cycle by the duration of a second phase offset ΔB.

It is known from the prior art that the transmitters of the optoelectronic machine guards are designed as LEDs, in particular IR-LEDs, and that each of these LEDs is assigned a pulse generator for its control in order to produce single light pulses and to control the intermediate pulse time $T_{Task}$. Here the pulse generator according to the invention can be configured so as to shorten or lengthen the intermediate pulse time $T_{Task}$ between two adjacent transmitters during a cycle by the duration of the phase offset ΔA, ΔB, wherein the pulse generator is designed so as to keep the intermediate pulse time $T_{Task}$ the same length in all other transmitters of the pertinent optoelectronic machine guard.

For example, alternatively the pulse generator can be configured so as to shorten or lengthen the intermediate pulse time $T_{Task}$ proportionally in all transmitter units of am optoelectronic machine guard during a cycle by the duration of the phase offset ΔA, ΔB.

Furthermore, in one embodiment of the photoelectric barrier, the phase offset ΔA (35) and the phase offset ΔB (37) can be set by the pulse generator such that, for interfered cycle, a minimal number of subsequent cycles are interference-free If more than two optoelectronic machine guards are built into a photoelectric barrier, each optoelectronic machine guard of the photoelectric barrier is configured so as to operate with a phase offset which differs from all other phase offsets of the other optoelectronic machine guards of the photoelectric barrier.

In addition, the invention pertains to an optoelectronic machine guard having a transmitter and receiver unit, in particular for implementing a method according to the invention or for use in a photoelectric barrier according to the invention, wherein the optoelectronic machine guard is operable at least in the following operating modes:

Operation with a first cycle, which is shortened or lengthened by the duration of a first phase offset ΔA, or Operation with a second cycle, which is shortened or lengthened by the duration of a second phase offset ΔB, or Operation with an unchanged cycle duration.

If these operating modes can be set for the individual optoelectronic machine guard, this has the advantage that only during construction of a photoelectric barrier according to the invention, for example to secure a manufacturing facility, does the operating mode of the optoelectronic machine guards have to be defined.

In one advantageous embodiment, the optoelectronic machine guard has a control element for setting the operating modes. Alternatively, this can be done using a software-supported control command.

Furthermore, it is advantageous if the transmitters are optically synchronized with the receivers of the optoelectronic machine guard and that simultaneously with activation of a transmitter, the receiver assigned to this transmitter is activated.

The method according to the invention or the photoelectric barrier according to the invention or the optoelectronic machine guard according to the invention has, inter alia, the advantages explained below in comparison with the known prior art. For example, the emission of single light pulses per sampling cycle increases the lifespan of the LEDs in the transmitters in comparison with embodiments of optoelectronic machine guards in which pulse groups are used as beam coding. Apart from that, the demand on the hardware for evaluating single light pulse is lower, for the effect of precision of the clock generators is of secondary importance for transmitters and receivers, and thus the expense for the receive circuit is also lower.

Furthermore, the probability that interference light pulses such as can be caused by interference light pulses from welding equipment, for example, destroy possible coding information in the light pulse is lower when non-coded single light pulses are used. Thus, single light pulses are more robust than pulse groups. In addition, in the evaluation of single light pulses, simpler algorithms can be used. More complex coding methods also as a rule require more implementation expense and are therefore more inefficient as regards memory use and CPU utilization.

BRIEF DESCRIPTION OF THE DRAWINGS

The above-named optional features can be effected in any combination as long as they are not mutually exclusive. Further advantages and features of the invention arise from the following description of the invention with reference to the schematic representations.

Wherein.

DETAILED DESCRIPTION OF THE INVENTION

Figure 1:
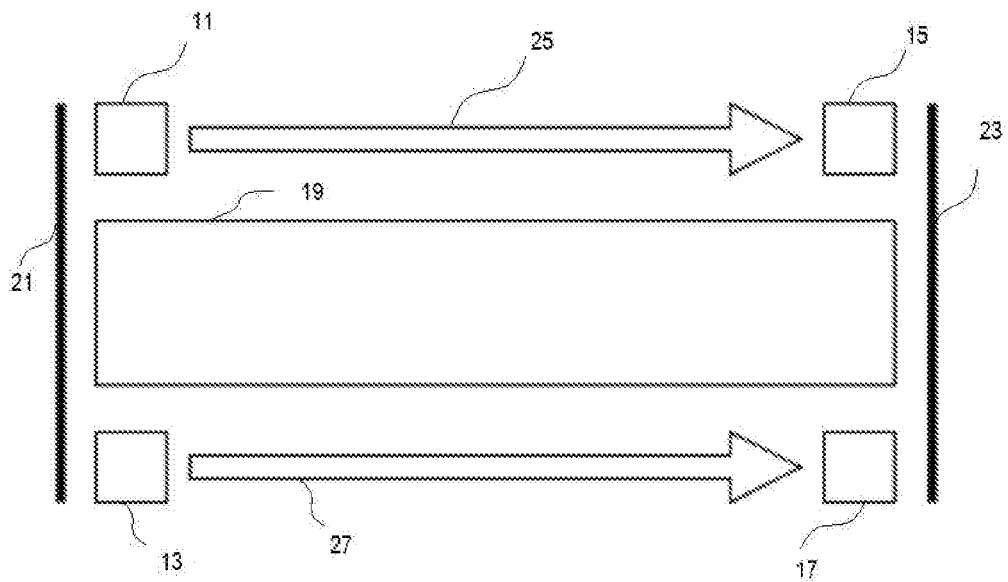
FIG. 1: a schematic representation of a photoelectric barrier.

FIG. 1 shows a photoelectric barrier according to the invention. The photoelectric barrier secures a hazard area 19, which for its part is delimited by walls 21, 23, and which has two entry ways, which are secured by two optoelectronic machine guards. The first optoelectronic machine guard substantially consists of a first transmitter unit 11 and a first receiver unit 15, and emits light beams in the main beam direction 25 of the first optoelectronic machine guard. Analogous to this, the second optoelectronic machine guard essentially consists of a second transmitter unit 13 and a second receiver unit 17 and emits light beams in the main beam direction 27 of the second optoelectronic machine guard. Each transmitter unit 11, 13 has at least one transmitter, not shown, which is controlled by a pulse generator, likewise not shown, in a known manner. Here a pulse general can be assigned to each transmitter, or a pulse general can control several transmitters sequentially. Each receiver unit 15, 17 of an optoelectronic machine guard has the same number of receivers as it has transmitters.

Based on spatial proximity, it cannot be ruled out that light beams which are emitted by the transmitter unit 11 of the first optoelectronic machine guard jump to the receiver unit 17 of the second optoelectronic machine guard and lead to false detections.

Figure 2:
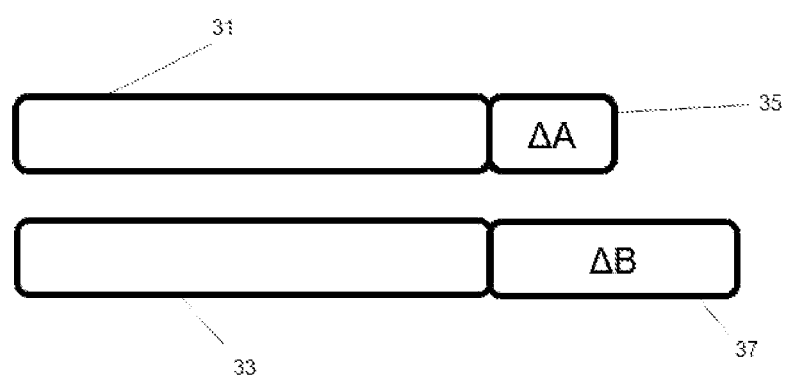
FIG. 2: a schematic representation of implementation of the phase offset with optoelectronic machine guards of the same length, wherein the time is plotted on the notional x-axis.

In order to avoid this, therefore, in accordance with the invention, the cycle time 31 of the first optoelectronic machine guard is acted on with a phase offset ΔA 35 and the cycle time 33 of the second optoelectronic machine guard is acted on with a phase offset ΔB 37. Here it should be noted that FIG. 2 schematically shows the chronological situation is shown for optoelectronic machine guards which have the same length, or more precisely, which have the same number of transmitters and receivers, or emit the same number of light beams.

FIG. 4 shows a diagram which illustrates the chronological sequence of the single light pulses. On the uppermost time axis the single light pulses 41, 42, 43 of a second optoelectronic machine guard are shown, and on the time axis below that the single light pulses 45, 46, 47 of a first optoelectronic machine guard in the cycle $n_{Zyklus}$. It is plain that the single light pulses 41 with 45, 42 with 46, and 43 with 47 occur simultaneously; in this shown cycle $n_{Zyklus}$, the single light pulses of the two optoelectronic machine guards overlap or interfere with one another. In addition, the single light pulses 41, 42, and 43 or 45, 46, and 47 are separated from one another in time, wherein the separation is the intermediate pulse time $T_{Task}$. All single light pulses have the same pulse width $T_{Puls}$.

Figure 3:
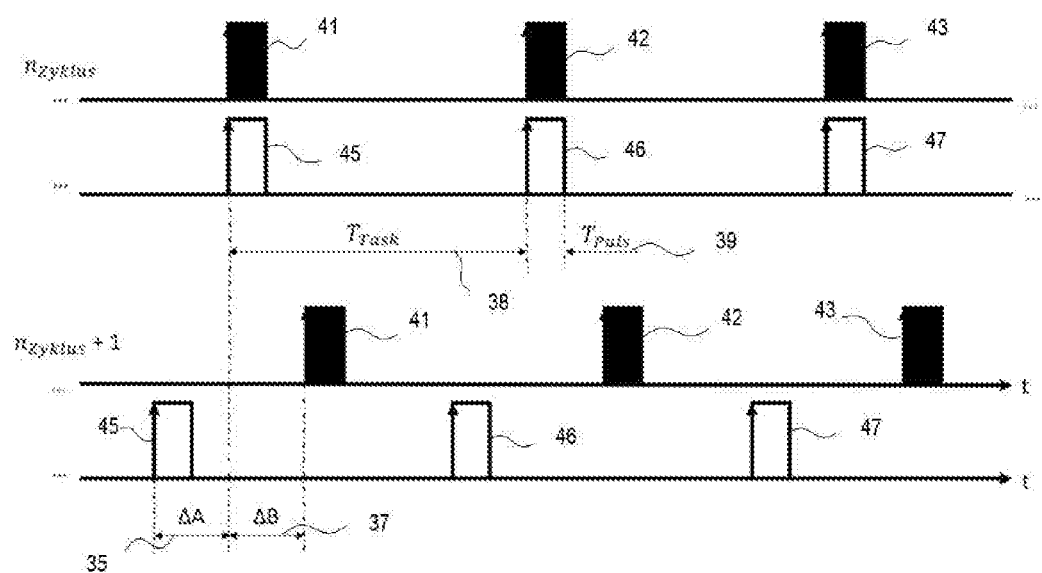
FIG. 3: a diagram which illustrates the chronological sequence of the single light pulses.

FIG. 3 shows on the bottom two time axes the chronological situation of the single light pulses 41, 42, 43 or 45, 46, and 47 in the cycle $n_{Zyklus}+1$. Here it is discernible that the single light pulse 45—and subsequently the single light pulses 46 and 47—are emitted a phase offset ΔA 35 earlier than was the case in the cycle $n_{Zyklus}$. The single light pulse 41, and subsequently the single light pulses 42 and 43 are emitted a phase offset ΔB 37 later than was the case in the cycle $n_{Zyklus}$ It is discernible that the single light pulses 41, 42, 43 or 45, 46, and 47 of the two optoelectronic machine guards overlap for this cycle. Interference-free operation is ensured.

In the $n_{Zyklus}+2$, not shown, the single light pulses 41, 42, and 43 as well as the other single light pulses, not shown, of the second optoelectronic machine guard are again emitted a phase offset ΔA 35 earlier, and the single light pulses 45, 46, and 47 as well as the other single light pulses, not shown, of the first optoelectronic machine guard are again emitted later by the phase offset ΔB 37. There occurs a chronologically different distribution of the single light pulses, although again an overlap is ruled out, until the minimal number of cycles is achieved that was assumed in the calculation.

Thus the method according to the invention or the photoelectric barrier according to the invention ensures that, out of a defined number of cycles, always at most one is systematically subjected to interference. This is achieved especially due to different-length cycle times in the first and second light barrier.

The method according to the invention or the photoelectric barrier according to the invention is shown for two potentially influenced optoelectronic machine guards. However, in the scope of the idea according to the invention, it is also possible to select a higher number of optoelectronic machine guards.

Generally it has to be noted that in the description the general term optoelectronic machine guard or photoelectric barrier was used. This term in the scope of the invention also comprises light barriers and light curtains or light barrier arrangements and light curtain arrangements. Furthermore, it should be noted that the invention was explained on the basis of the single light pulses. It goes without saying, however, that the invention can also be used with optoelectronic machine guards with multiple light pulses, such as for example double pulses. Here according to the invention it should be noted that the multiple light pulses do not overlap. In the simplest case that means that in calculating the phase offsets, the duration of emission of the multiple light pulses must be equated with the pulse width $T_{Puls}$ of the single light pulse for an optoelectronic machine guard with single light pulses.

The invention claimed is:

1. A method of operating a photoelectric barrier, comprising:
using at least one first and one second optoelectronic machine guard, wherein the at least one first optoelectronic machine guard has first transmitter units and first receiver units, and the at least one second optoelectronic machine guard has second transmitter units and second receiver units, wherein all first transmitters of the first transmitter units and receiver units are successively activated during a first run of a first cycle so as to emit a first single light pulse and all second transmitters of the second transmitter units and receiver units are successively activated during a second run of a second cycle so as to emit a second single light pulse, and the first and second cycles occur substantially simultaneously, wherein a first duration of the first cycle is lengthened or shortened by a first duration of a first phase offset ΔA and a second duration of the second cycle is lengthened or shortened by a duration of a second phase offset ΔB, and wherein for a given pulse width $T_{puls}$ of the first or second single light pulses and for a given average pulse intermediate time $T_{Task}$, the following inequality applies for determining the first phase offset ΔA and the second phase offset ΔB:

$$T_{Puls} \leq \left( n_{Zyklus} \cdot \Delta A - \left\lfloor \frac{n_{Zyklus} \cdot N_{Beams_A}}{N_{Beams_B}} \right\rfloor \cdot \Delta B \right) \mod T_{Task} \leq T_{Task} - T_{Puls}.$$

wherein

∀ $n_{Zyklus}$={1, . . . ,($N_{samples}$=1)}

∀ $N_{Beams_A}$=a number of beams of the first or second optoelectronic machine guard with the coding $A$ ∀ $N_{Beams_B}$=a number of beams of the first or second optoelectronic machine guard with the coding $B$.

2. The method of operating a photoelectric barrier according to claim 1, wherein during the first or second cycle a pulse intermediate time $T_{task}$ in a single transmitter of each of the at least one first and at least one second optoelectronic machine guards is shortened or lengthened by the first or second durations of the phase first or second offsets ΔA, ΔB, and that the pulse intermediate time $T_{Task}$ in all other transmitters of the respective first or second optoelectronic machine guards is a same length.

3. The method of operating a photoelectric barrier according to claim 1, wherein for all transmitters of the at least one first and second optoelectronic machine guards during the first or second cycle, the pulse intermediate time $T_{Task}$ is proportionally shortened or lengthened by the first or second durations of the phase offset ΔA or ΔB.

4. The method of operating a photoelectric barrier according to claim 1, wherein restrictions apply for determining the first phase offset ΔA and the second phase offset ΔB, the restrictions comprising:

|ΔA|≥$T_{Puls}$

|ΔB|≥$T_{Puls}$ and

ΔA≠ΔB.

5. The method of operating a photoelectric barrier according to claim 4, wherein a further restriction for determining the first phase offset ΔA and the second phase offset ΔB applies, the further restriction comprising:

|ΔA|=|ΔB|.

6. The method of operating a photoelectric barrier according to claim 1, further comprising, operating the optoelectronic machine guards in one of the following operating modes:
operating with a first cycle, which is shortened or lengthened by the duration of a first phase offset ΔA, or
operating with a second cycle, which is shortened or lengthened by the duration of a second phase offset ΔB, or
operating with an unchanged cycle duration.

7. The method of operating a photoelectric barrier according to claim 1, further comprising optically synchronizing the first and second transmitters with one another and activating simultaneously with the activation of a transmitter, a receiver assigned to said transmitter.

8. The method of operating a photoelectric barrier according to claim 1, further comprising selecting the phase offset ΔA and the phase offset ΔB so that a minimal number of subsequent cycles are interference free per each interfered cycle.

9. The method of operating a photoelectric barrier according to claim 1, further comprising obtaining the first phase offset ΔA and the second phase offset ΔB for a photoelectric barrier in which a number of transmitters and thus a number of light beams are of equal size.

10. The method of operating a photoelectric barrier according to claim 1, further comprising operating each of the first or second optoelectronic machine guards of the photoelectric barrier with a phase offset that differs from all other phase offsets of the other first or second optoelectronic machine guards of the photoelectric barrier.

11. A photoelectric barrier, comprising:
at least one first and one second optoelectronic machine guard, wherein the first optoelectronic machine guard has a first transmitter unit and a first receiver units and the second optoelectronic machine guard has a second transmitter unit and a second receiver unit, wherein each first transmitter of the first optoelectronic machine guard is successively activated during a first run of the first cycle so as to emit first single light pulses and each second transmitter of the second optoelectronic machine guard is successively activated during a second run of a second cycle so as to emit second single light pulses, and the first and second cycles occur substantially simultaneously, the first optoelectronic machine guard configured to lengthen or shorten a first duration of the first cycle by a duration of a first phase offset ΔA and the second optoelectronic machine guard configured to lengthen or shorten a second duration of the second cycle by a duration of a second phase offset $\Delta B$, wherein for a given pulse width $T_{puls}$ of the first or second single light pulses and for a given average pulse intermediate time $T_{Task}$, the following inequality applies for determining the first phase offset $\Delta A$ and the second phase offset $\Delta B$:

$$T_{Puls} \le \left( n_{Zyklus} \cdot \Delta A - \left\lfloor \frac{n_{Zyklus} \cdot N_{Beams_A}}{N_{Beams_B}} \right\rfloor \cdot \Delta B \right) \mod T_{Task} \le T_{Task} - T_{Puls}.$$

wherein

∀ $n_{Zyklus}=\{1, \ldots ,(N_{samples}=1)\}$

∀ $N_{Beams_A}$=a number of beams of the first or second optoelectronic machine guard with the coding $A$ ∀ $N_{Beams_B}$=a number of beams of the first or second optoelectronic machine guard with the coding $B$.

12. The photoelectric barrier according to claim 11, wherein each transmitter of the first and second optoelectronic machine guards has an LED to which a pulse generator is assigned in order to control it, so as to produce single light pulses and to control a pulse intermediate time $T_{Task}$, the pulse generator of each of the first and second optoelectronic machine guards configured to shorten or lengthen the pulse intermediate time $T_{Task}$ between two adjacent transmitters by the duration of the phase offset $\Delta A$ or $\Delta B$, and the pulse generator configured to keep the pulse intermediate time $T_{Task}$ of equal length for all other transmitters of the first and second optoelectronic machine guards.

13. The photoelectric barrier according to claim 12, wherein the pulse generator is configured to shorten or lengthen the pulse intermediate time $T_{Task}$ in all transmitters of an optoelectronic machine guard during the first or second cycle proportionally by the duration of the phase offset $\Delta A$ or $\Delta B$.

14. The photoelectric barrier according to claim 12, wherein the phase offset $\Delta A$ and the phase offset $\Delta B$ are set by the pulse generator such that a minimal number of subsequent cycles are interference-free for each interfered cycle.

15. The photoelectric barrier according to claim 11, wherein each of the first or second optoelectronic machine guard of the photoelectric barrier is configured to operate with a phase offset that differs from all other phase offsets of the other first or second optoelectronic machine guard of the photoelectric barrier.

16. The photoelectric barrier according to claim 11, wherein the first and second optoelectronic machine guards are operated in one of the following operating modes:
   operation with the first cycle, which is shortened or lengthened by the duration of a first phase offset $\Delta A$, or
   operation with the second cycle, which is shortened or lengthened by the duration of a second phase offset $\Delta B$, or
   operation with an unchanged cycle duration.

17. The photoelectric barrier according to claim 16, the operating modes are set by a control element attached to the first and second optoelectronic machine guards.

18. The photoelectric barrier according to claim 11, wherein the operating modes are set by a software-supported control command.

19. The photoelectric barrier according to claim 11, wherein each of the first and second transmitters are optically synchronized with an assigned receiver and that simultaneously with activation of one of the first or second transmitter, the assigned receiver is activated.

* * * * *